United States Patent [19]
Utsunomiya et al.

[11] Patent Number: 5,552,237
[45] Date of Patent: Sep. 3, 1996

[54] MAGNETOOPTICAL RECORDING MEDIUM

[75] Inventors: Hajime Utsunomiya; Masanori Kosuda, both of Nagano, Japan

[73] Assignee: TDK Corporation, Tokyo, Japan

[21] Appl.. No.: 29,394

[22] Filed: Mar. 10, 1993

[30] Foreign Application Priority Data

Sep. 30, 1992 [JP] Japan .................... 4-285440

[51] Int. Cl.$^6$ .................... G11B 5/66
[52] U.S. Cl. .................... 428/634 ML; 428/634 DF; 428/634 SC; 428/634 NF; 428/634 XS; 428/900; 369/13; 369/288
[58] Field of Search .................... 428/644 OE, 644 SC, 428/644 NF, 644 XS, 644 ML, 900; 369/13, 280

[56] References Cited

U.S. PATENT DOCUMENTS

| | | | |
|---|---|---|---|
| 4,466,035 | 8/1984 | Connell | 360/114 |
| 4,610,912 | 9/1986 | Takahashi et al. | 428/213 |
| 4,680,742 | 7/1987 | Yamada | 369/13 |
| 4,717,628 | 1/1988 | Takahashi et al. | 428/457 |
| 4,786,559 | 11/1988 | Murakami et al. | 428/472 |
| 5,058,099 | 10/1991 | Murakami | 369/288 |
| 5,143,797 | 9/1992 | Hashima et al. | 428/694 RL |

FOREIGN PATENT DOCUMENTS

| | | |
|---|---|---|
| 0387420 | 9/1990 | European Pat. Off. . |
| 0487275 | 5/1992 | European Pat. Off. . |
| 201247 | 11/1984 | Japan . |
| 231306 | 11/1985 | Japan . |
| 63009047 | 1/1988 | Japan . |
| 1064150 | 3/1989 | Japan . |
| 2-267752 | 1/1990 | Japan . |
| 2-292753 | 4/1990 | Japan . |
| 223043 | 9/1990 | Japan . |
| 2-285533 | 11/1990 | Japan . |

*Primary Examiner*—Leszek Kiliman
*Attorney, Agent, or Firm*—Watson Cole Stevens Davis PLLC

[57] ABSTRACT

In a magnetooptical recording medium comprising a first dielectric layer, a recording layer, a second dielectric layer, a metal reflective layer, and a protective coat on a substrate, magnetooptical recording is carried out in a magnetic field modulation mode using recording light. The first dielectric layer is thinner than the thickness corresponding to the primary minimum reflectivity in the reflectivity versus thickness curve of dielectric layer measured at the light wavelength. This provides an increased recording sensitivity and an increased recording power margin over which recording/reproducing operation can be carried out at low error rates and high resolution.

11 Claims, 2 Drawing Sheets

MAGNETOOPTICAL RECORDING MEDIUM

TECHNICAL FIELD

This invention relates to magnetooptical recording media.

BACKGROUND OF THE INVENTION

Among optical recording media, magnetooptical recording media are regarded promising because of their information capacity and great efforts are now concentrated on their research. The magnetooptical recording media generally include a recording layer in the form of a magnetic film formed on a transparent substrate through a dielectric layer. In more advanced form, a second dielectric layer is formed on the recording layer so that the recording layer intervenes between a pair of dielectric layers. Also a metal reflective layer is provided as the uppermost layer for increasing the output of reproduced signals.

Most promising among the metal reflective layers are those of aluminum and aluminum alloys from the standpoints of optical reflectivity and cost. For example, U.S. Pat. No. 4,717,628 discloses an Al—Ni alloy containing 2 to 10 at % of Ni which is advantageous in recording sensitivity and reproducing C/N. Also Japanese Patent Application Kokai (JP-A) Nos. 292753/1990, 285533/1990 and 267752/1990 disclose Al-Ta alloys, Al-Re alloys, and Al-Nb alloys, respectively.

Where such a metal reflective layer is provided, the second dielectric layer between the recording layer and the metal reflective layer is often of nitrides such as silicon nitride and aluminum nitride. In particular, silicon nitride having a refractive index of approximately 2 is believed to produce good enhancement effect when disposed below the metal reflective layer. However, both the metal reflective layer and the second dielectric layer of nitrides have sufficiently high thermal conductivity to promote heat dissipation from the recording layer during recording. This leads to several drawbacks including low recording sensitivity, and high recording power threshold (Pth) at which recording is started, which negates low power recording.

Optical recording requires not only a low recording power threshold, but also a low error rate and in the case of light modulation mode recording, for example, a low minimum recording power (Pmin) at which the byte error rate (BER) reaches $5 \times 10^{-5}$ or less. The prior art structure, however, is also insufficient in this minimum recording power (Pmin).

On the other hand, the resolution between recording signals is reduced as the recording power is increased. In the light modulation mode, the recording power margin is defined as (P max-Pmin) wherein Pmax is the maximum recording power at which a certain resolution, for example, the resolution between 3T and 8T signals at a revolution number between 1,800 rpm and 3,600 rpm in accordance with ISO Standard, §324.1, decreases to 40%. For any recording mode, the recording power margin is desired to be as wide as possible. Every recording/reproducing apparatus has a number of variable factors in recording/reproducing conditions. More particularly, the recording laser power varies with every drive unit and optical and detection systems have their own factors. In addition, the apparatus experiences temperature variations and deterioration with time of laser power, deterioration with time of the optical and detection systems, tilt angle variations of the disk on loading, scattering due to dust, and the like. Interchangeability between drive units of different types is also necessary. For these reasons, a wider recording power margin is desired in order to always ensure stable recording/reproducing operation irrespective of varying factors in an apparatus or between different apparatus or between different types of apparatus. This facilitates the design and control of the drive unit. The prior art structure, however, has a narrow recording power margin.

Then for increasing the recording sensitivity and recording power margin of magnetooptical recording media for stable recording/reproducing operation, the inventors proposed the second dielectric layer formed on the metal reflective layer side of the recording layer that contains at least one of oxides of rare earth elements inclusive of Y, silicon oxide and silicon nitride (Japanese Patent Application No. 40277/1992). The use of such a second dielectric layer results in significantly increased recording sensitivity especially in the light modulation mode. More particularly, among the recording sensitivities, the recording power threshold (Pth) at which recording is started is significantly lowered. This threshold (Pth) lowering is believed due to the fact that the second dielectric layer has sufficiently low thermal conductivity to provide heat accumulating effect to the recording layer even in the presence of a metal reflective layer having high thermal conductivity. Moreover, this proposal also significantly lowers, among the recording sensitivities, the minimum recording power (Pmin) at which the byte error rate (BER) reaches $5.0 \times 10^{-5}$ or less in the light modulation mode. And the recording power margin (Pmax-Pmin) between the maximum recording power Pmax at which a resolution of at least 40% is available and Pmin is substantially increased.

The recording methods for magnetooptical recording disks include light and magnetic field modulation modes. The light modulation mode performs recording using modulated recording laser light. In the magnetic field modulation mode, recording is carried out by directing recording laser light from an optical head to the recording layer of the disk in a DC manner for increasing the temperature thereof, and at the same time, applying a modulated magnetic field to the recording layer from a magnetic head disposed opposite to the optical head. Therefore, the latter mode enables overwriting recording and is thus in progress toward commercial application to rewritable disks as typified by mini-disks (MD).

In the magnetic field modulation mode, however, since continuous laser light is irradiated, heat is applied to the disk in a different manner from the light modulation mode, resulting in increased occurrence of jitter. The MD standard defines the optimum power as 1.4×Pmin and the recording power margin as (Pmax-Pmin)/2 wherein Pmin and Pmax are the minimum and maximum powers, respectively, at which the jitter of 3T signals is less than 40 nsec. when EFM signals are recorded at a circumferential linear velocity (CLV) of 1.4 m/s under an applied magnetic field of 200 Oe. As in the previous case, it is desired to have a lower optimum power and a wider margin.

It is, however, found that all the layer arrangements designed for a low optimum power and a wide recording power margin in recording of the light modulation mode do not provide an adequate optimum power and recording power margin when recorded in the magnetic field modulation mode.

SUMMARY OF THE INVENTION

A primary object of the present invention is to provide a novel and improved magnetooptical recording medium which provide a low optimum power and a wide recording power margin when recorded in the magnetic field modulation mode.

According to the present invention, there is provided a magnetooptical recording medium comprising a first dielectric layer, a recording layer, a second dielectric layer, a metal reflective layer, and a protective coat on a substrate in the described order, wherein magnetooptical recording is carried out in a magnetic field modulation mode using recording light having a predetermined wavelength. The first dielectric layer is thinner than the thickness Tmin corresponding to the primary minimum reflectivity in the reflectivity versus thickness curve of the dielectric layer measured at the wavelength.

Preferably, the first dielectric layer has a thickness in the range of from 30 nm to 0.99Tmin and a refractive index of 1.8 to 3.0. It is predominantly formed of silicon nitride. Also preferably, the second dielectric layer has a refractive index of 1.8 to 3.0 and a thickness of up to 80 nm. It is predominantly formed of silicon nitride or contains at least one of oxides of rare earth elements inclusive of yttrium, silicon oxide, and silicon nitride. Also preferably, the recording layer contains a rare earth element and iron. It may further contain 5 to 15 at % of Co and 2 to 10 at % of Cr in an atomic ratio Co/Cr of from 1/2 to 5/1. It is 10 to 1,000 nm thick.

ADVANTAGES

According to the present invention, the first dielectric layer is thinner than the thickness Tmin corresponding to the primary minimum reflectivity in the reflectivity versus thickness curve so that it has satisfactory reflectivity and sufficiently lower thermal capacity to allow the underlying resinous substrate to exert more heat accumulation effect, resulting in improved sensitivity. This sensitivity increase leads to a reduced minimum power Pmin and a reduced optimum recording power Po and at the same time, quite unexpectedly, an increased recording power margin. This advantage is never achieved in the conventional media wherein the first dielectric layer always has a thickness greater than Tmin.

Since the first dielectric layer has a reduced thickness as compared with the corresponding dielectric layer of the conventional media, it can be formed within a shorter time. The dielectric material, typically silicon nitride of which first dielectric layer is made generally takes a long time until it builds up to a certain thickness by sputtering while cooling means is necessary. Then a reduction of the film depositing time contributes to productivity. Further the increased sensitivity allows for the use of recording material having a higher Curie temperature Tc, resulting in improved C/N and temperature characteristics. The medium can thus be designed such that it may maintain performance even at high temperatures.

DETAILED DESCRIPTION OF THE INVENTION

Figure 1:
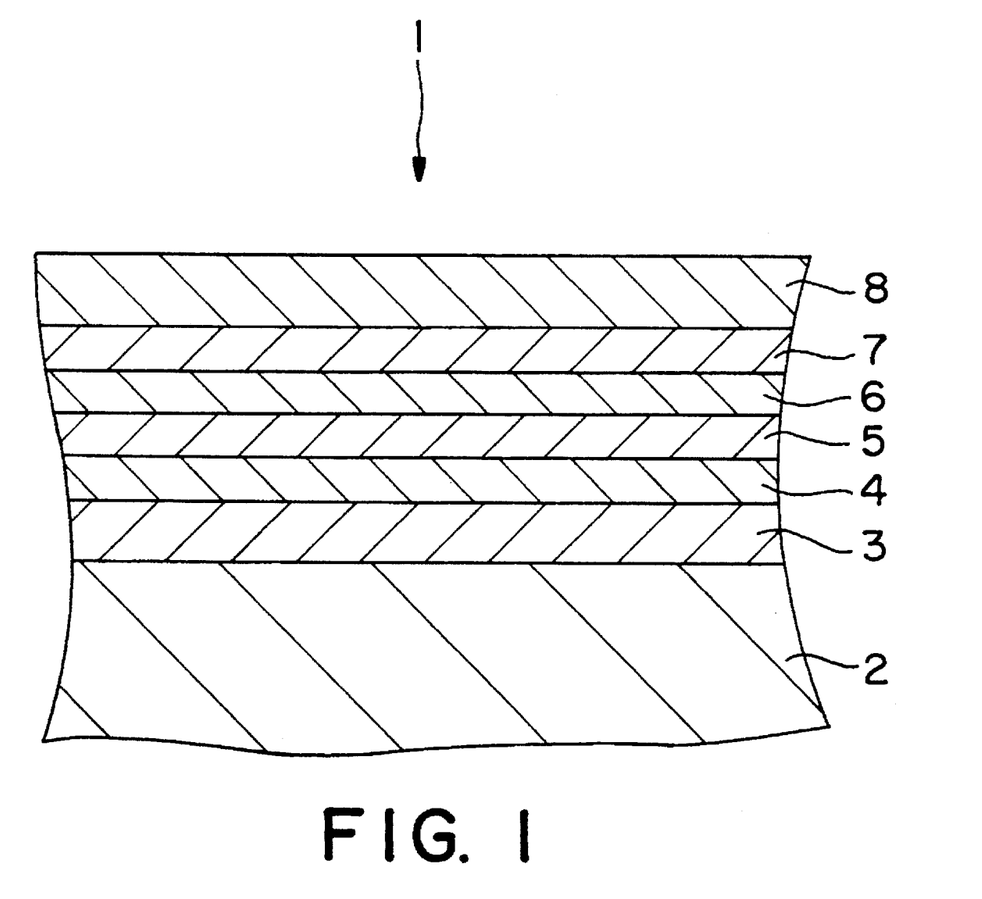
FIG. 1 is a schematic cross-section of a magnetooptical recording medium according to one preferred embodiment of the invention.

Referring to FIG. 1, a magnetooptical recording medium according to one preferred embodiment of the present invention is illustrated in fragmental cross-sectional view. The medium 1 includes a protective layer 3, a first dielectric layer 4, a recording layer 5, a second dielectric layer 6, a metal reflective layer 7, and a protective coat 8 laid up on one major surface of a substrate 2 in the described order.

The first dielectric layer 4 is disposed between the substrate 2 and the recording layer 5 for providing enhancement effect to the recording layer 5 and for improving corrosion resistance. The layer 4 is thinner than the thickness Tmin corresponding to the primary minimum reflectivity of its reflectivity versus thickness curve so that its own thermal capacity is reduced, allowing the underlying substrate resin to fully exert its heat accumulating effect. This results in improved sensitivity, reduced Pmin, reduced optimum power 1.4×Pmin, and increased recording power margin (Pmax−Pmin)/2 wherein Pmin and Pmax are the minimum and maximum powers, respectively, at which the jitter is less than 40 nsec.

Figure 2:
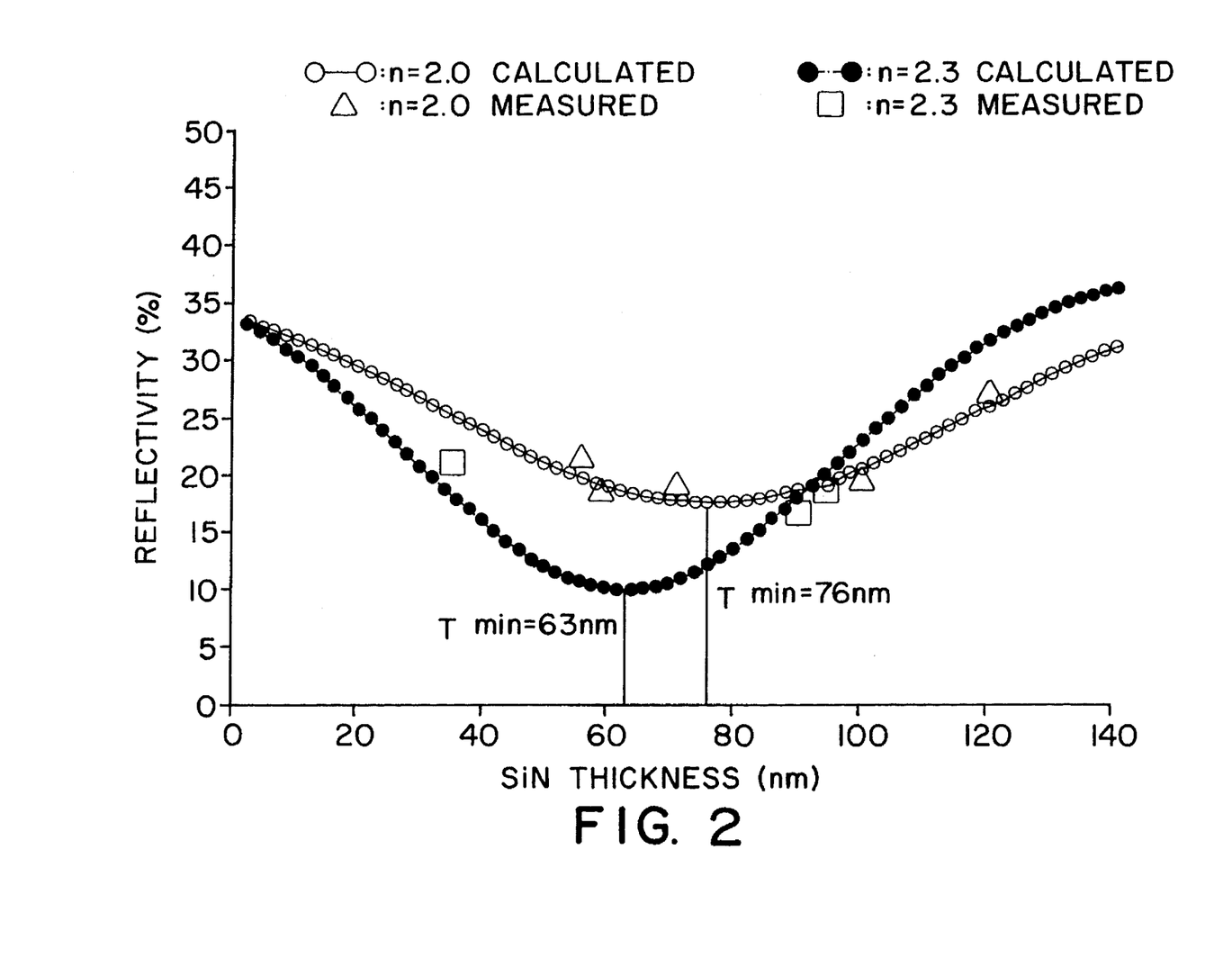
FIG. 2 is a graph showing the reflectivity versus thickness of a SiNx dielectric layer.

The primary minimum reflectivity of a dielectric layer is described. In a reflectivity versus thickness curve of a dielectric film as measured with recording light wherein reflectivity varies with thickness, maximum and minimum reflectivity points periodically appear due to interference within the film. In FIG. 2, the reflectivity of SiNx film as measured with recording light having a wavelength of 780 nm is plotted relative to its thickness. The curves shown in FIG. 2 are simulation curves for SiNx film samples wherein x is changed whereby refractive index n is changed, that is, n=2.0 when x=1.3 and n=2.3 when x=0.75. Actual measurements are also plotted in the graph of FIG. 2 as points in squares and triangles. It is evident that the simulation curves are in close agreement with the actual measurements. It is seen that there exists along each curve the primary minimum reflectivity point. The term primary means the first appearance as observed from thickness zero. The thickness Tmin corresponding to the primary minimum reflectivity is approximately 76 nm and 63 nm for n=2.0 and 2.3, respectively. Then the curves suggest that a desired reflectivity can be established by setting a film thickness to be smaller than the thickness Tmin. The present invention is predicated on this finding. The prior art did not use a film thickness smaller than Tmin because thicker dielectric layers ensuring corrosion resistance and reliability were believed better for increasing reflectivity.

We have found that dielectric layers of silicon nitride or the like are sufficient to provide corrosion resistance and reliability even at a thickness of approximately 30 nm. Then the first dielectric layer preferably has a thickness of at least 30 nm, more preferably at least 40 nm, especially at least 45 nm. The upper limit is 0.99Tmin, more preferably 0.98Tmin, especially 0.96Tmin. It should be understood that Tmin is generally from about 40 nm to about 90 nm for the possible range of n.

Preferably the first dielectric layer has a refractive index n (real part of complex refractive index) of 1.8 to 3.0, especially 1.8 to 2.5 at a wavelength of 600 to 900 nm. Smaller values of n provide reduced Kerr rotation angle and reduced outputs whereas larger values of n leads to reduced outputs and increased noise.

As to the composition of the first dielectric layer 4, various dielectric materials may be used including oxides, carbides, nitrides, and sulfides, for example, $SiO_2$, SiO, AlN, $Al_2O_3$, $Si_3N_4$, ZnS, BN, $TiO_2$, TiN, etc., and mixtures thereof. Preferred are those layers predominantly comprised of silicon nitride, especially at least 90% by weight of silicon nitride and those layers consisting essentially of silicon nitride. They may be prepared by various gas phase deposition techniques, especially sputtering. The sputtering techniques include use of a sintered body of corresponding composition as a target and reactive sputtering using nitrogen or the like.

The second dielectric layer 6 is disposed on the recording layer 5 for providing enhancement effect to the recording layer 5 and for improving corrosion resistance. It is possible to use any of the materials used in the first dielectric layer 4. It will be understood, however, that materials containing at least 90% by weight of silicon nitride and materials containing at least one of oxides of rare earth elements inclusive of yttrium, silicon oxide and silicon nitride are advantageous since they provide improved sensitivity due to heat accumulation and increased recording power margins when the metal reflective layer 7 is formed.

Most preferred for the second dielectric layer 6 are the latter materials containing at least one of oxides of rare earth elements inclusive of yttrium, silicon oxide and silicon nitride. The rare earth elements used herein include Y, La to Sm, and Eu to Ln and mixtures thereof. Lanthanides inclusive of Y, especially La and/or Ce are preferred. Oxides of La and Ce usually take the form of $La_2O_3$ and $CeO_2$. They generally have a stoichiometric composition although any deviation therefrom is acceptable. Where La and/or Ce is contained, either or both of La and Ce oxides may be present. Where both La and Ce oxides are present, their ratio is not critical. In addition to La and/or Ce oxide, any of oxides of other rare earth elements such as Y and Er may be co-present in an amount of about 10 at % or less (calculated as metal) of the total rare earth element oxides. Additionally, any of oxides of Fe, Mg, Ca, Sr, Ba, Al, etc. may be co-present wherein iron is up to 10 at % and the remaining elements are up to 10 at % in total.

In the most preferred example, the second dielectric layer 6 contains silicon oxide and silicon nitride in addition to the rare earth element oxide. Usually silicon oxide is present in the form of $SiO_2$ or SiO and silicon nitride is present in the form of $Si_3N_4$. They generally have a stoichiometric composition although any deviation therefrom is acceptable. Preferably, the second dielectric layer contains rare earth element oxides and silicon compounds such that the molar ratio of the total of rare earth element oxides to the total of rare earth element oxides plus silicon compounds ranges from about 0.05 to about 0.5, provided that all the components are calculated as having respective stoichiometric compositions, that is, the layer contains about 5 to about 50 mol % of rare earth element oxides calculated on a stoichiometric basis. Lower ratios would lead to reduced outputs and reduced durability in a hot humid atmosphere whereas higher ratios would lead to increased noise and reduced durability in a hot humid atmosphere. The atomic ratio of rare earth element to silicon preferably ranges from about 0.03 to about 0.6. The second dielectric layer preferably has an atomic O/N ratio of from about 0.2 to about 3 since lower ratios would lead to reduced durability in a hot humid atmosphere whereas higher ratios would lead to reduced outputs and deterioration with time. These atomic ratios may be measured by conventional analysis such as Auger electron spectroscopy and electron diffraction. It will be understood that the second dielectric layer may have graded concentrations of oxygen and nitrogen.

Preferably the second dielectric layer has a refractive index n (real part of complex refractive index) of 1.8 to 3.0, especially 1.8 to 2.5 at a wavelength of 600 to 900 nm. Smaller values of n provide reduced Kerr rotation angle and reduced outputs whereas larger values of n lead to reduced outputs and increased noise.

Sputtering is preferably employed for forming the second dielectric layer 6. The targets used herein are sintered mixtures of a rare earth element oxide or oxides, preferably $La_2O_3$ and/or $CeO_2$, $SiO_2$ and $Si_3N_4$. Part or all of the rare earth element oxide or oxides, especially $La_2O_3$ and/or $CeO_2$ may then be replaced by oxides of pyrophoric alloys such as Auer metal, Huber metal, misch metal, and Welsbach metal. Similarly, other gas phase deposition techniques such as CVD, evaporation and ion plating may also be employed. The dielectric layer may contain impurities such as Ar and $N_2$ which are incorporated from the film depositing atmosphere. Other acceptable impurities are Fe, Ni, Cr, Cu, Mn, Mg, Ca, Na, K, or the like.

Preferably the second dielectric layer 6 has a thickness of up to 80 nm, more preferably 5 to 60 nm, most preferably 5 to 50 nm. Within this range, thinner layers are preferred for increasing light transmittance and outputs. If the reflective layer 7 on the second dielectric layer 6 is of material having a lower thermal conductivity, then the second dielectric layer 6 can be thinner. Too thin layers can cause increased noise whereas a thickness in excess of 80 nm would lead to reduced outputs and C/N. The second dielectric layer 6 as constructed above is low stressed, fully durable against thermal cycling, and effective for protecting the recording layer.

The metal reflective layer 7 is disposed on the second dielectric layer 6 and formed of any of well-known metal materials which include Au, Ag, Al, Cu, Cr, Ni, Ti and Fe and alloys thereof. Preferred among these are Al, Ni and alloys thereof. Aluminum alloys and nickel alloys are especially preferred since they provide desired reflectivity, increased outputs, increased sensitivity and widened recording power margin when combined with the second dielectric layer.

Preferred aluminum alloys are those containing 80 to 9% by weight of Al and at least one element of Ni, Fe, V, Mo, Hf, W, Au, Si, Mg, Mn, Cr, Ta, Ti, Re, Zn, In, Pb, P, Sb, Cu, Zr, Nb, Bi, etc. These aluminum alloys are most effective in widening the recording power margin while increasing the C/N and recording sensitivity. Most preferred are Al—Ni alloys consisting essentially of up to 20%, especially 1 to 10% by weight of nickel and the balance of aluminum.

Also nickel alloys are preferred since they are low in thermal conductivity and most effective in improving recording sensitivity. Preferred are those nickel alloys containing 35 to 75% by weight of nickel and at least one element of Co, Cr, Mo, W and Fe. More preferred are those nickel alloys containing 35 to 75%, especially 40 to 70% by weight of Ni, 0.1 to 5%, especially 0.5 to 5% by weight of Co, 0.1 to 25%, especially 0.5 to 25% by weight of Cr, 0 to 6% by weight of W, 2 to 30%, especially 5 to 30% by weight of Mo, and 0.1 to 25%, especially 1 to 22% by weight of Fe, which are also known as Hastelloy. These alloys may additionally contain up to 3% by weight of Cu, Nb and Ta, up to 2% by weight of Mn, and/or up to 1% by weight of Si and Ti. These nickel alloys ensure very high sensitivity when combined with the second dielectric layer. The use of nickel alloys having a low thermal conductivity allow the second dielectric layer 6 to be thinner for obtaining increased outputs and the metal reflective layer 7 itself to be thinner.

The metal reflective layer is preferably 40 to 150 nm, more preferably 50 to 100 nm thick. A too thin metal reflective layer would be ineffective for providing the necessary reflection, resulting in reduced outputs and C/N whereas a too thick layer would result in reduced sensitivity.

With metal reflective layer 7 deposited, the medium should preferably have a light reflectivity of at least 15%.

The reflective layer 7 has a refractive index n (real part of complex refractive index) of 1.5 to 3.5 and an extinction coefficient k (imaginary part of complex refractive index) of 2.5 to 7.0. The reflective layer 7 may be formed by gas phase deposition techniques such as sputtering, evaporation and ion plating, preferably by sputtering.

The protective coat 8 is disposed on the reflective layer 7. It may be formed from various resinous materials, typically UV-curable resins to a thickness of about 0.1 to 100 μm. It may be either a deposited layer or a preformed sheet. Preferably it is formed by coating a composition comprising a radiation-curable compound such as acrylate and a photopolymerization sensitizer and curing the coating with radiation.

The recording layer 5 disposed between the first and second dielectric layers 4 and 6 is one in which information can be magnetically recorded using a modulated magnetic field and the recorded information be reproduced through magneto-optical conversion. The recording layer 5 may be formed of any desired material which is capable of such magnetooptical recording. Preferably, it is prepared by depositing an alloy containing a rare earth metal element, especially a rare earth metal-transition metal alloy by sputtering, evaporation or ion plating, preferably by sputtering, to form an amorphous film.

The preferred rare earth metal is at least one element of Tb, Dy, Nd, Gd, Sm, and Ce and contained in amounts of about 15 to 23 at %. The preferred transition metals are Fe and Co. Then the alloy preferably contains about 55 to 85 at % of Fe and Co in total.

Some preferred examples of the recording layer composition are TbFeCo, DyTbFeCo, NdDyFeCo, and NdGdFeCo. The recording layer may contain up to 30 at % of Cr, Al, Ti, Pt, Si, MO, Mn, V, Ni, Cu, Zn, Ge, Au or the like. It may further contain up to 10 at % of another rare earth metal element such as Sc, Y, La, Ce, Pt, Pm, Sm, Eu, Ho, Er, Tm, Yb, and Lu. Those compositions further containing about 5 to 15 at % of Co and about 2 to 10 at % of Cr at a Co/Cr atomic ratio of from about 1/2 to about 5/1 are preferred since they have a Curie temperature Tc of 150° to 170° C. and better temperature characteristics. The recording layer is generally about 10 to 1,000 nm thick.

If desired, the protective layer 3 is provided between the substrate 2 and the first dielectric layer 4. It may be formed of glass, for example, borosilicate glass, barium borosilicate glass, and aluminum borosilicate glass, which may further contain $Si_3N_4$. Preferred are borosilicate glass, barium borosilicate glass, and aluminum borosilicate glass containing 40 to 80% by weight of $SiO_2$, which may be partially replaced by $Si_3N_4$. The protective layer 3 is generally about 30 to 150 nm thick.

The substrate 2 may be formed of any desired material which is substantially transparent to recording and reproducing light usually having a wavelength of 400 to 900 nm, typically semiconductor laser light having a wavelength of 600 to 850 nm, most often 780 nm. The term substantially transparent means a transmittance of at least 80%. Then recording and reproducing operation can be done from the rear side of the substrate remote from the recording layer. Usually the substrate materials are glass and resins. Examples of the transparent resin include thermoplastic resins such as polycarbonate resins, acrylic resins, and amorphous polyolefin resins.

If necessary, the substrate 2 on the outer surface or outer periphery is provided with an oxygen impermeable coating. The surface of the substrate 2 on which the recording layer 5 is formed is provided with grooves and pits for tracking purposes, if desired. The rear surfaces of the substrate which are remote from the recording layer may be coated with protective films which may be of the same material as the organic protective coat 8.

The present invention is adapted for magnetooptical recording of the magnetic field-modulation mode. The magnetic field-modulation mode is to carry out recording by positioning a magnetic head on the face side (recording layer side) and an optical head on the rear side of a magnetooptical recording disk, directing laser light of a certain intensity from the optical head to the recording layer of the disk through the substrate and at the same time, applying a modulated magnetic field across the laser spot in the recording layer from the magnetic head. The relative position of the magnetic and optical heads is fixed and they move together in a radial direction of the disk for making access to a desired track. The applied magnetic field has an intensity of about 80 to 300 Oe. The magnetic and optical heads used herein are not critical and may be selected from conventional heads used in magnetooptical recording of the magnetic field-modulation mode.

Example

Examples of the present invention are given below by way of illustration and not by way of limitation.

Example 1

SiNx films were formed on substrates to various thicknesses by RF magnetron sputtering using a silicon target and nitrogen gas. There were formed two SiNx films wherein x=1.30, n=2.0 and k≅0 and x=0.75, n=2.3 and k≅0. Refractive index n was measured by an ellipsometer. Using these values of n and k, a reflectivity versus film thickness curve for light having a wavelength of 780 nm was determined by computer simulation. The results of simulation are shown in FIG. 2 together with actual measurements.

Next, polycarbonate resin was injected molded into substrates of 64 mm in diameter and 1.2 mm thick. On these substrates, a first dielectric layer of SiNx as mentioned above was formed by RF magnetron sputtering. For the SiNx wherein x=1.30 and n=2.0, the thickness Tmin corresponding to the primary minimum reflectivity is equal to 76 nm as seen form FIG. 2, and layers having a thickness of 58 nm smaller than Tmin and 100 nm greater than Tmin were formed so that equivalent reflectivity (20%) was available. For the SiNx wherein x=0.75 and n=2.3, Tmin is equal to 63 nm as seen form FIG. 2, and layers having a thickness of 30 nm smaller than Tmin and 95 nm greater than Tmin were formed so that equivalent reflectivity (20%) was available.

On the first dielectric layer, a recording layer having the composition: $Tb_{19.0}Fe_{65.0}Co_{8.0}Cr_{8.0}$ (Tc=150° C.) was deposited to a thickness of 20 nm by sputtering.

On the recording layer, a second dielectric layer consisting of 30 molt of $La_2O_3$, 20 mol % of $SiO_2$ and 50 mol % of $Si_3N_4$ (this composition is referred to as LaSiON) was formed by RF magnetron sputtering. This layer had a thickness of 20 nm, n=2.0, k≅0, and an atomic ratio of rare earth element to silicon of 0.35.

On the second dielectric layer, a metal reflective layer was formed to a thickness of 90 nm by RF magnetron sputtering. This layer consisted of 97.0 at % of Al and 3.0 at % of Ni.

On the reflective layer, a protective coat was formed to a thickness of 5 μm by applying a UV-curable resin containing oligo-ester acrylate and exposing it to ultraviolet radiation.

It is to be noted that all the coatings were analyzed for composition by Auger spectroscopy.

The resulting magnetooptical recording disk samples were measured for reflectivity, optimum recording power and recording power margin.

Reflectivity (R)

Semiconductor laser having a wavelength of 780 nm was directed to the disk while the reflectivity of the disk at 780 nm was measured by a magnetooptical recording disk test machine.

Optimum recording power and recording power margin

EFM signals were recorded in the disk by rotating the disk at a CLV of 1.4 m/s, directing continuous laser light having a wavelength of 780 nm, and applying a magnetic field of 200 Oe for magnetic field modulation. The 3T signal jitter was measured while varying the recording power. The minimum and maximum powers Pmin and Pmax at which the jitter reached 40 nsec. or less were measured, and the optimum recording power Po=1.4*Pmin and the recording power margin (Pmax-Pmin)/2 were calculated therefrom. The results are shown in Table 1.

TABLE 1

| First dielectric layer | | | | | |
|---|---|---|---|---|---|
| n | Tmin (nm) | Thickness (nm) | R (%) | Po (mW) | Margin (mW) |
| 2.0 | 76 | 58 | 18.8 | 4.75 | 1.35 |
| 2.0 | 76 | 100 | 18.8 | 4.90 | 1.05 |
| 2.3 | 63 | 30 | 19.0 | 4.4 | 1.2 |
| 2.3 | 63 | 95 | 19.0 | 4.6 | 0.9 |

As seen from Table 1, first dielectric layers having a thickness smaller than Tmin are effective for producing a reduced Po and increased margin as compared with first dielectric layers having a thickness larger than Tmin, but having the same reflectivity.

Example 2

Experiments were done as in Example 1 by using the SiNx layer wherein n=2.0 and Tmin=76 nm in Example 1 as the first dielectric layer and the LaSiON layer in Example 1 or a SiNx layer wherein x=1.30, n=2.0, k≅0 as the second dielectric layer and setting the first and second dielectric layers to a thickness of 60 nm and 20 nm, respectively. The Al—Ni reflective layer was 60 nm thick. The results are shown in Table 2.

TABLE 2

| 1st/2nd dielectric layer | R (%) | Po (mW) | Margin (mW) |
|---|---|---|---|
| SiN/SiN (60/20 nm) | 20.0 | 4.7 | 0.95 |
| SiN/LaSiON (60/20 nm) | 20.0 | 4.2 | 1.1 |

It is evident from Table 2 that a second dielectric layer of LaSiON system is more effective.

Example 3

A disk was prepared in accordance with Example 1 using the first dielectric layer of SiNx (x=1.30, n=2.0, Tmin=76 nm) having a thickness of 58 run except that the recording layer was of the composition: $Tb_{18.0}Fe_{64.0}Co_{10.0}Cr_{8.0}$ having Tc=160° C. Another disk was prepared in accordance with Example 1 by forming a recording layer of $Tb_{19.0}Fe_{65.0}Co_{8.0}Cr_{8.0}$ (Tc=150°) as in Example 1, a first dielectric layer of SiNx (x=1.30, n=2.0, Tmin=76 nm) having a thickness of 120 nm, and a second dielectric layer of SiNx (x=1.30, n=2.0) having a thickness of 40 nm. Both the disks included an Al—Ni reflective layer having a thickness of 60 nm and had a reflectivity of 20%.

The disks were measured for Po both at room temperature and 70° C. and an increase of jitter at 70° C. The results are shown in Table 3.

TABLE 3

Comparative disk
Layer arrangement

1st dielectric layer: SiN 120 nm
Recording layer: $Tb_{19.0}Fe_{65.0}Co_{8.0}Cr_{8.0}$ (Tc = 150°)
2nd dielectric layer: SiN 40 nm
Properties R: 20%
Po: 4.5 mW (RT)    4.0 mW (70° C.)
Jitter: +5 ns increase (70° C.)

Inventive disk
Layer arrangement

1st dielectric layer: SiN 60 nm
Recording layer: $Tb_{18.0}Fe_{64.0}Co_{10.0}Cr_{8.0}$ (Tc = 160°)
2nd dielectric layer: LaSiON 20 nm
Properties R: 20%
Po: 4.5 mW (RT)    4.25 mW (70° C.)
Jitter: +2 ns increase (70° C.)

It is evident from Table 3 that the present invention allows a recording layer to have a higher Tc, resulting in better temperature characteristics.

While the preferred embodiment of our invention has been described fully in order to explain its principles, it is understood that various modifications or alterations may be made without departing from the scope of the invention as set forth in the appended claims.

We claim:

1. A magneto-optical recording medium, comprising:

a first dielectric layer, a recording layer, a second dielectric layer, a metal reflective layer, and a protective coat on a substrate in the described order, said first dielectric layer is thinner than the thickness Tmin corresponding to the minimum reflectivity in the reflectivity versus thickness curve of the first dielectric layer measured at the selected wavelength, and said first dielectric layer has a refractive index of 1.8 to 2.3, said recording layer contains a rare earth element including terbium (Tb), iron (Fe), cobalt (Co) and Chromium (Cr), the content of Tb being 5 to 23 at %, the content of Co being 5 to 15 at %, the content of Cr being 2 to 10%, an atomic ratio of Co/Cr being 1/2 to 5/1, and the total content of said rare earth element Fe, Co and Cr and being 100 at %, said recording layer operating in a magnetic field modulation mode using recording light having a wavelength in the range of 400 to 900 nm; and said medium has a light reflectivity of at least 15% at the selected wavelength.

2. The magneto-optical recording medium of claim 1, wherein said first dielectric layer has a thickness in the range of from 30 nm to 0.99 T min.

3. The magneto-optical recording medium of claim 1, wherein said first dielectric layer is composed of at least 90% by weight of silicon nitride.

4. The magneto-optical recording medium of claim 1, wherein said second electrical layer has a thickness of up to 80 nm.

5. The magneto-optical recording medium of claim 1, wherein said second dielectric layer is composed of at least 90% by weight of silicon nitride.

6. The magneto-optical recording medium of claim 1, wherein said second dielectric layer contains at least one of oxides of rare earth elements, yttrium oxide, silicon oxide and silicon nitride.

7. The magneto-optical recording medium of claim 1, wherein said recording layer contains a rare earth element, iron, 15 to 23 at % of terbium, and 15 to 15 at % of Co and 2 to 10 at % of Cr in an atomic ratio Co/Cr of from 1/2 to 5/1.

8. The magneto-optical recording medium of claim 1, wherein said recording layer is 10 to 1,000 nm thick.

9. The magneto-optical recording medium of claim 1, wherein said first dielectric layer has a thickness in the range of from 30 nm to 0.96 Tmin.

10. The magneto-optical recording medium of claim 1, wherein said wavelength is from 600 nm 780 nm.

11. The magneto-optical recording medium of claim 1, wherein the light reflectivity is 15 to 20%.

\* \* \* \* \*

UNITED STATES PATENT AND TRADEMARK OFFICE
CERTIFICATE OF CORRECTION

PATENT NO. : 5,552,237
DATED : September 3, 1996
INVENTOR(S) : Hajime UTSUNOMIYA ET AL.

It is certified that error appears in the above-indentified patent and that said Letters Patent is hereby corrected as shown below:

Claim 4, column 11, line 5 should read:

--wherein said second dielectric layer has a thickness of up to --

Signed and Sealed this

Eighteenth Day of March, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,552,237

DATED : September 3, 1996

INVENTOR(S) : Hajime Utsunomiya et al.

It is certified that error appears in the above-identified patent and that said Letters Patent is hereby corrected as shown below:

On the title page, item [54] and col. 1 line 1, should read --MAGNETO-OPTICAL RECORDING MEDIUM--

Claim 1, column 10, line 58 should read --content of said rare earth element Fe, Co and Cr--

Claim 4, column 11, line 5 should read --wherein said second dielectric layer has a thickness of up to--

This Certificate supersedes Certificate of Correction issued March 18, 1997

Signed and Sealed this

Fifteenth Day of April, 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,552,237
DATED : 3 September 96
INVENTOR(S) : HajimeUTSUNOMIYA & Masanori KOSUDA It is certified that error appears in the above-identified patent and that said Letters Patent is hereby corrected as shown below:

In claim 1: Column 10, line 54 should read:

"the content of Tb being 15 to 23 at %, the content of Co"

Signed and Sealed this

Sixth Day of July, 1999

Attest:

Q. TODD DICKINSON

*Attesting Officer*  *Acting Commissioner of Patents and Trademarks*